Nov. 16, 1971    J. C. DUNAWAY    3,620,089

FLUIDIC GYRO CAGING AND NULLING DEVICE

Filed Nov. 6, 1969

J. C. Dunaway,
INVENTOR.

BY Harry M. Saragovitz
Edward J. Kelly
Herbert Berl
Aubrey J. Dunn

United States Patent Office 3,620,089
Patented Nov. 16, 1971

3,620,089
FLUIDIC GYRO CAGING AND NULLING DEVICE
J. C. Dunaway, Falkville, Ala., assignor to the United
States of America as represented by the Secretary of
the Army
Filed Nov. 6, 1969, Ser. No. 874,608
Int. Cl. F15c 1/14; G01c 19/28
U.S. Cl. 74—5.6                    3 Claims

ABSTRACT OF THE DISCLOSURE

A gyro rotor having an air bearing ball is caged by a fluidic system that forces the ball against one side of its housing. The fluidic system also forces the rotor to a predetermined spin axis null position. The rotor is uncaged by inactivating the fluidic system. The rotor ball is supported by air supplied to its housing, with the air exiting along the spin axis of the rotor. The fluidic system includes a proportional amplifier having feedback pickoffs fed by the air exiting along the rotor spin axis.

BACKGROUND OF THE INVENTION

This invention is in the field of gyros, and relates particularly to caging methods for air-bearing supported gyro rotors. Various cagings methods are known, using mechanical or pneumatic-mechanical devices. One such device consists of a tapered pin mounted on the gyro case, which fits into a tapered hole along the spin axis of the gyro rotor. The rotor is caged by inserting the pin into the hole, and uncaged by removing the pin. Another device uses spring-loaded pads which cage the rotor by pressing against the rotor in the absence of air pressure. When air pressure is applied to the gyro air bearing it is also applied to pistons connected to the pads, and causes the pads to retract, and uncage the rotor. As can be readily realized, each of these systems requires additional moving parts to the gyro. The invention, by using fluidics, accomplishes caging and nulling without the addition of moving parts.

SUMMARY OF THE INVENTION

A fluid device for caging and nulling a gyro rotor. The rotor is supported in operation by an air bearing. The exhaust air from the bearing exits along the rotor axis and is used to feed control jets of a fluidic amplifier. The rotor is caged by applying air pressure both the air bearing and fluidic amplifier. The output of the fluidic amplifier forces the bearing against its housing. Additionally the output is proportioned by the feedback to null the rotor position. The rotor is uncaged by turning off the air pressure to the fluidic amplifier.

DESCRIPTION OF THE PREFERRED EMBODIMENT

Figure 1:
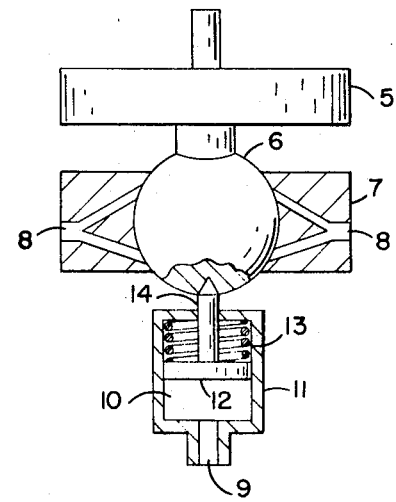
FIG. 1 is a schematic showing of one prior art gyro rotor caging device.

The invention may be best understood by reference to the drawings. The same reference numerals are used to show corresponding elements. FIG. 1 shows one prior art device for caging gyro rotor 5. The rotor is supported by a gas bearing including ball 6, and housing 7 with gas gas passageways 8 therein. The ball is caged by applying gas pressure through passageway 9 to cylinder 10 in housing 11. The pressure in 10 forces piston 12 against spring 13. Piston 12 moves pin 14 into a recess in ball 6, and forces the ball into contact with housing 7. Rotor 5 is thus caged. The rotor may be uncaged by releasing the pressure in cylinder 10.

Figure 2:
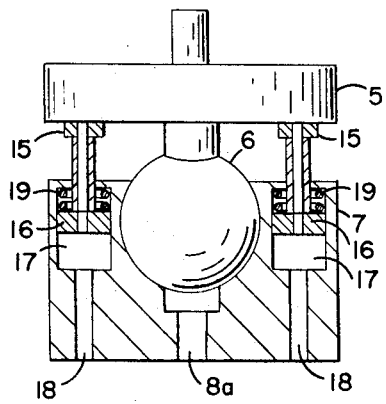
FIG. 2 is a schematic showing of another such prior art device.

FIG. 2 shows another prior art device for caging a gyro rotor (5), and includes a gas bearing having ball 6 and housing 7. The caging is accomplished by means of air bearing pads 15 operated by pistons 16 in cylinder 17. Air pressure applied to cylinder 17 through passageways 18 causes pistons 16 to compress springs 19 and force pads 15 adjacent rotor 5. In this condition, ball 6 is forced into contact with housing 7, and rotor is thus caged. Air pressure is supplied to the gas bearing through passageway 8a.

Figure 3:
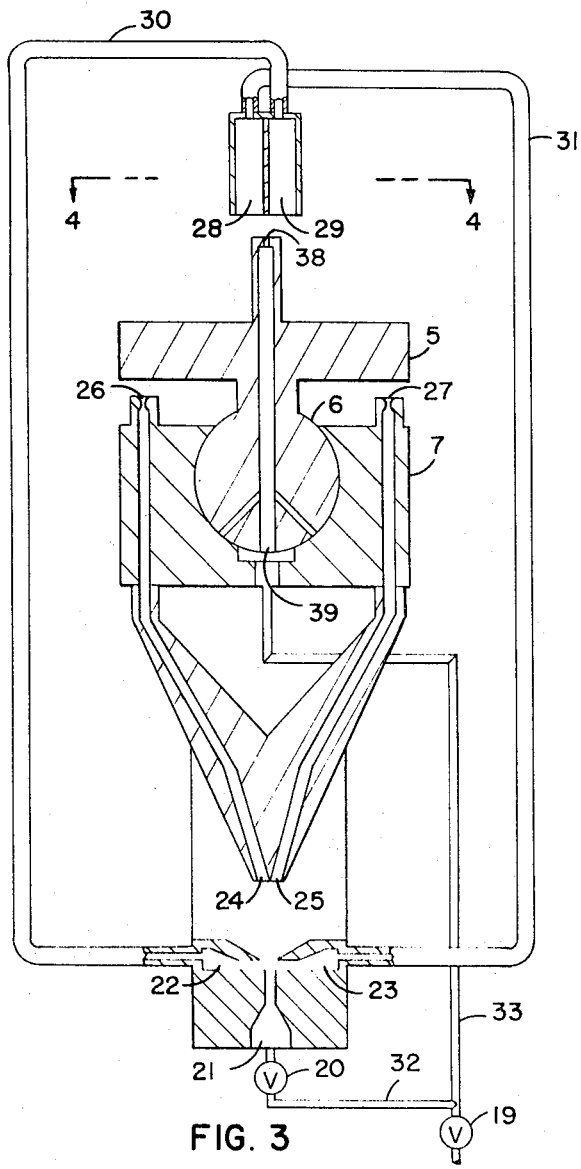
FIG. 3 is a schematic elevation, partly in section, of the invention.

The preferred embodiment of the invention as shown in FIG. 3 includes rotor 5, ball 6, and housing 7, corresponding to like numbered elements in FIGS. 1 and 2. Valves 19 and 20 are connected to a source of gas pressure (not shown). A fluidic proportional amplifier is included in this figure and includes a power nozzle 21, control nozzles 22 and 23, receiver ports 24 and 25, caging jets 26 and 27, feedback ports 28 and 29, and feedback passageways 30 and 31. Valve 19 admits air pressure both to the air bearing (including ball 6, etc.) and to the fluidic amplifier, by respective lines 32 and 33.

Figure 4:
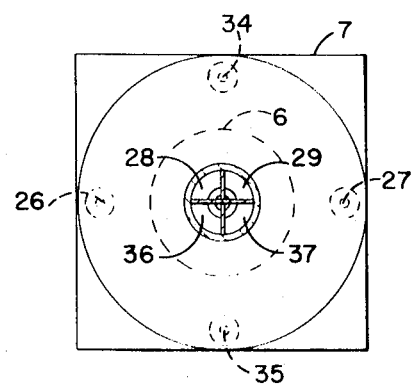
FIG. 4 is a sectional view of the invention taken on the line 4—4 of FIG. 3.

FIG. 4 reveals that besides jets 26 and 27 and feedback ports 28 and 29, there are also jets 34 and 35, and feedback ports 36 and 37.

Referring again to FIG. 3, it should be understood that this showing merely shows the proper control jets, etc. for nulling rotor 5 in the plane of the drawing paper. Additional control jets (not shown) are necessary, orthogonal to jets 22 and 23. These additional jets operate in the same manner as 22 and 23, and are fed by feedback passageways (not shown) from feedback ports 36 and 37. Caging jets 34 and 35 are supplied by additional receiver ports (not shown) orthogonal to ports 24 and 25.

Feedback through ports 28, 29, 36 and 37 is supplied by an exit jet 38. This jet receives exit gas from the gas gearing, and straight-through gas from passageway 39. Rotor 5 and ball 6 have two degrees of freedom, and jet 38 may supply one or more of feedback ports 28, 29, 36 or 37.

Valve 19, when opened, allows gas pressure to reach both the gas bearing and the fluidic amplifier. Valve 20 controls the caging and uncaging of the gyro rotor by the fluidic system.

While a specific embodiment of the invention has been shown and described, other embodiments may be obvious to one skilled in the art, in light of this disclosure. For example, only three receiving ports, feedback ports, caging jets, and control jets may be used with 120° spacing around the gyro axis. By the same token, more than four of each of these last named items may be used, with proper angular spacing.

I claim:
1. A gyro rotor caging and nulling device wherein said rotor is supported by a gas bearing having an exit jet coaxial with the spin axis of the rotor, including: a fluid amplifier having a power jet, receiver ports, caging jets, control jets for said power jet, feedback ports located gen- erally around the spin axis of said rotor adjacent said exit jet and equal in number to said control jets, feedback passageways between respective feedback ports and control jets, and with said caging jets adjacent said rotor and connected to said receiver ports, whereby gas from said exit jet enters said feedback ports to control the deflection of said power jet to said receiver ports and whereby the fluid from said caging jets impinges on said rotor and forces it to a null position.

2. The device as recited in claim 1 wherein said gas bearing has two degrees of freedom, and each of said receiving ports, caging jets, control jets, and feedback ports are equally spaced around the spin axis of rotor.

3. The device as recited in claim 2 wherein there are at least three of each of the recited jets and ports.

References Cited

UNITED STATES PATENTS

| | | | |
|---|---|---|---|
| 3,416,378 | 12/1968 | Evans et al. | 74—5.6 |
| 3,435,688 | 4/1969 | Ogren | 74—5.6 |
| 3,492,879 | 2/1970 | Riordan et al. | 74—5.6 |

WILLIAM R. CLINE, Primary Examiner

U.S. Cl. X.R.

137—81.5